J. FLYNN.

Improvement in Dies for Welding and Forming Horse Shoe Toe-calks.

No. 123,256.

Patented Jan. 30, 1872.

Jeremiah Flynn
Inventor

By his Atty.

Witnesses.

UNITED STATES PATENT OFFICE.

JEREMIAH FLYNN, OF PORTLAND, CONNECTICUT.

IMPROVEMENT IN DIES FOR WELDING AND FORMING HORSESHOE TOE-CALKS.

Specification forming part of Letters Patent No. 123,256, dated January 30, 1872.

*To all whom it may concern:*

Be it known that I, JEREMIAH FLYNN, of Portland, in the county of Middlesex and State of Connecticut, have invented a new Improvement in Dies for Welding and Forming Toe-Calks on Horseshoes; and I do hereby declare the following, when taken in connection with the accompanying drawing and the letters of reference marked thereon, to be a full, clear, and exact description of the same, and which said drawing constitutes part of this specification, and represents in—

Figure 1:
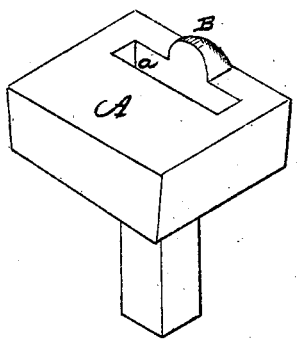
Figure 2:
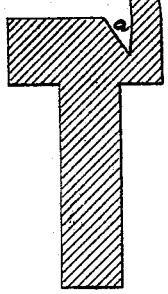
Figure 3:
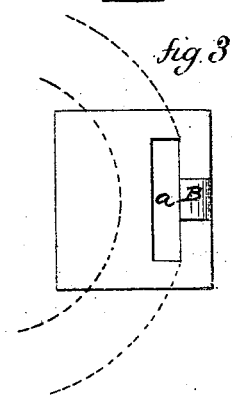

Figure 1 a perspective view of the die; Fig. 2, a transverse section of the same; Fig. 3, a top view; and in Fig. 4, the toe-calk blank as prepared for attachment to the shoe.

This invention relates to a device for welding and shaping the forward or toe-calk upon horseshoes, the object being to facilitate this process which has heretofore been done by hand.

Figure 4:
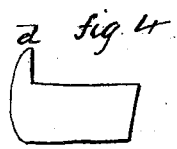

A is the die-block, formed with a recess, $a$, corresponding to the shape of the finished calk. B is a projection formed in front of the said recess, over which the guard or projection to extend up over the hoof forward is formed. The calk, as seen in Fig. 4, is formed with a projection, $d$, by means of which it is temporarily attached to the shoe; then heated to a welding heat. The calk is set into the recess $a$, the shoe being in the position seen in Fig. 3, in broken lines. Then the smith with his hammer welds the parts on the said block, the calk being formed in the said recess in proper shape, and at the same time forms a projection or guard upon the shoe on the part B, which is turned up onto the hoof by the shoer, or may be done by the smith making the shoe.

I claim as my invention—

The die for welding and forming toe-calks for horseshoes, consisting of the block A, with a recess, $a$, corresponding to the shape required for the calk, and the projection B formed thereon, as and for the purpose specified.

JEREMIAH FLYNN.

Witnesses:
 W. S. COE,
 JAMES LAVERTY.